US008873591B2

(12) United States Patent
Ghiasi et al.

(10) Patent No.: US 8,873,591 B2
(45) Date of Patent: Oct. 28, 2014

(54) SYSTEM AND METHOD FOR BIT-MULTIPLEXED DATA STREAMS OVER MULTIRATE GIGABIT ETHERNET

(75) Inventors: Ali Ghiasi, Cupertino, CA (US); Velu Pillai, Austin, TX (US)

(73) Assignee: Broadcom Corporation, Irvine, CA (US)

( * ) Notice: Subject to any disclaimer, the term of this patent is extended or adjusted under 35 U.S.C. 154(b) by 77 days.

(21) Appl. No.: 13/250,628

(22) Filed: Sep. 30, 2011

(65) Prior Publication Data

US 2013/0083810 A1 Apr. 4, 2013

(51) Int. Cl.
  *H04J 3/04* (2006.01)
  *H04L 25/49* (2006.01)
  *H04L 12/933* (2013.01)

(52) U.S. Cl.
  CPC ............ *H04L 25/49* (2013.01); *H04J 3/047* (2013.01); *H04L 49/109* (2013.01)
  USPC ....................................................... 370/535

(58) Field of Classification Search
  CPC .................................................. H04J 3/04
  USPC ....................................................... 370/535
  See application file for complete search history.

(56) References Cited

U.S. PATENT DOCUMENTS

| 7,382,805 | B1 * | 6/2008 | Raza et al. | 370/528 |
| 7,463,706 | B2 * | 12/2008 | Sefidvash et al. | 375/354 |
| 7,965,712 | B2 * | 6/2011 | Handelman | 370/391 |
| 8,090,047 | B2 * | 1/2012 | Fujimori et al. | 375/295 |
| 8,098,661 | B2 * | 1/2012 | Handelman | 370/391 |
| 8,223,768 | B2 * | 7/2012 | Handelman | 370/391 |
| 8,331,793 | B2 * | 12/2012 | Takeuchi et al. | 398/140 |
| 8,385,374 | B1 * | 2/2013 | Wohlgemuth | 370/509 |
| 8,553,785 | B2 * | 10/2013 | Chiabrera | 375/253 |
| 2012/0327769 | A1 * | 12/2012 | Ghiasi et al. | 370/235 |

OTHER PUBLICATIONS

"A Physical Coding Sublayer for 100GbE," G. Nicholl, M. Gustlin, and O. Trainin, IEEE Applications & Practice, Dec. 2007.*
"100GbE PHY and MAC Layer Implementations," H. Toyoda, G. Ono, and S. Nishimura, IEEE Communications Magazine, Mar. 2010.*
"10:4 MUX and 4:10 DEMUX Gearbox LSI for 100-Gigabit Ethernet Link," G. Ono, K. Watanabe, T. Muto, H. Yamashita, K. Fukuda, N. Masuda, R. Nemoto, E. Suzuki, T. Takemoto, F. Yuki, M. Yagyu, H. Toyoda, A. Kambe, T. Saito, and S. Nishimura, 2011 IEEE International Solid-State Circuits Conference, Feb. 22, 2011.*
"The Technical Feasibility of a 100GE PCS and Electrical Interface," O. Trainin, M. Gustlin and G. Nicholl, IEEE Higher Speed Study Group Jan. 2007.*

(Continued)

*Primary Examiner* — Mark Rinehart
*Assistant Examiner* — Kenneth P Hunt
(74) *Attorney, Agent, or Firm* — Sterne, Kessler, Goldstein & Fox PLLC

(57) ABSTRACT

Input/output of network switches and the like are improved by a system including a gearbox, an inverse-gearbox, and a Gigabit Ethernet link coupling them. The gearbox and inverse-gearbox interconnect data streams received through wider lower rate Gigabit Ethernet interfaces through narrower faster rate interfaces. The gearbox is configured to bit-multiplex physical-layer data streams received through input interfaces to generate bit-multiplexed data streams. The inverse-gearbox is configured to demultiplex the multiplexed data streams and to output the recovered data streams through output interfaces. One of the output interfaces is selected for each recovered data stream according to a respective embedded physical-layer data stream identifier.

20 Claims, 13 Drawing Sheets

(56) References Cited

OTHER PUBLICATIONS

"Higher Speed Ethernet 40 or 100 GbE," D. Perkins, North American Network Operators' Group, Jun. 3-6, 2007.*

"Technologies & Architectures for Next Gen Ethernet Optical Client Interfaces," J. Anderson, Joint ITU-T/IEEE Workshop on the Future of Ethernet Transport, May 28, 2010.*

"MLG (Multi-Link Gearbox) Project Start Proposal," C. Cole, Optical Interworking Forum, Jul. 8, 2011.*

"40 Gigabit Ethernet and 100 Gigabit Ethernet: The Development of a Flexible Architecture," D'Ambrosia, IEEE Communications Magazine, Mar. 2009.*

"100GE and 40GE PCS (MLD) Proposal," IEEE 802.3a, May 2008.*

* cited by examiner

| PCS lane number | Encoding² {M₀,M₁,M₂,BIP₃,M₄,M₅,M₆,BIP₇} | PCS lane number | Encoding² {M₀,M₁,M₂,BIP₃,M₄,M₅,M₆,BIP₇} |
|---|---|---|---|
| 0 | 0xC1,0x68,0x21,BIP₃,0x3E,0x97,0xDE,BIP₇ | 10 | 0xFD,0x6C,0x99,BIP₃,0x02,0x93,0x66,BIP₇ |
| 1 | 0x9D,0x71,0x8E,BIP₃,0x62,0x8E,0x71,BIP₇ | 11 | 0xB9,0x91,0x55,BIP₃,0x46,0x6E,0xAA,BIP₇ |
| 2 | 0x59,0x4B,0xE8,BIP₃,0xA6,0xB4,0x17,BIP₇ | 12 | 0x5C,0xB9,0xB2,BIP₃,0xA3,0x46,0x4D,BIP₇ |
| 3 | 0x4D,0x95,0x7B,BIP₃,0xB2,0x6A,0x84,BIP₇ | 13 | 0x1A,0xF8,0xBD,BIP₃,0xE5,0x07,0x42,BIP₇ |
| 4 | 0xF5,0x07,0x09,BIP₃,0x0A,0xF8,0xF6,BIP₇ | 14 | 0x83,0xC7,0xCA,BIP₃,0x7C,0x38,0x35,BIP₇ |
| 5 | 0xDD,0x14,0xC2,BIP₃,0x22,0xEB,0x3D,BIP₇ | 15 | 0x35,0x36,0xCD,BIP₃,0xCA,0xC9,0x32,BIP₇ |
| 6 | 0x9A,0x4A,0x26,BIP₃,0x65,0xB5,0xD9,BIP₇ | 16 | 0xC4,0x31,0x4C,BIP₃,0x3B,0xCE,0xB3,BIP₇ |
| 7 | 0x7B,0x45,0x66,BIP₃,0x84,0xBA,0x99,BIP₇ | 17 | 0xAD,0xD6,0xB7,BIP₃,0x52,0x29,0x48,BIP₇ |
| 8 | 0xA0,0x24,0x76,BIP₃,0x5F,0xDB,0x89,BIP₇ | 18 | 0x5F,0x66,0x2A,BIP₃,0xA0,0x99,0xD5,BIP₇ |
| 9 | 0x68,0xC9,0xFB,BIP₃,0x97,0x36,0x04,BIP₇ | 19 | 0xC0,0xF0,0xE5,BIP₃,0x3F,0x0F,0x1A,BIP₇ |

FIG. 8

SYSTEM AND METHOD FOR BIT-MULTIPLEXED DATA STREAMS OVER MULTIRATE GIGABIT ETHERNET

BACKGROUND OF THE INVENTION

1. Field of the Invention

Embodiments of this invention are related to increasing the input/output of devices such as network switches.

2. Background Art

Increasing demands are being placed on data communications infrastructure. These increasing demands are driven by various factors including the increased bandwidth requirements for Internet usage and for data center demands Many currently available network switches support 10 Gigabit Ethernet (GbE) links. Whereas for some entities one 10 GbE link is adequate for connecting to a larger network, other entities may require multiple of such links to meet their bandwidth demands. Growing bandwidth demands require that technology keeps improving to support higher bandwidth links. The IEEE 802.3ba task force has the objective of standardizing 100 GbE and 40 GbE over the Internet and within the data center. Even higher transmission rates are likely to be standardized in the future.

Transition to higher rate Ethernet links is likely to be gradual. With current technology, 100 GbE requires the multiplexing of 4 different wavelengths. Similarly, currently available routers, switches and servers cannot handle single 100 Gbps or 40 Gbps data streams, and is likely that they will use parallel electrical paths to handle the 100 Gbps or 40 Gbps data; for example, using 10 lanes of 10 GbE.

The IEEE 802.3 Ethernet specification introduces the physical coding sublayer (PCS), a network protocol stack sublayer that defines virtual lanes (VL) which allow for handling changing numbers and bandwidths of optical and electrical links. As GbE technology improves, the bandwidth of the optical and the electrical links are likely to improve at different rates, and the PCS virtual lanes can be utilized to transport traffic over the different types of links and interfaces. However, conventional GbE technology does not adequately address the transport of lower rate data streams from independent sources over higher bandwidth GbE links.

Therefore, methods and systems for efficiently transporting lower rate data streams from multiple sources over the higher bandwidth GbE links are desired.

BRIEF SUMMARY OF THE INVENTION

Embodiments of the present invention are directed to improving input/output of network switches and the like. According to an embodiment, a system includes a gearbox, an inverse-gearbox, and at least one Gigabit Ethernet link coupling the at least one first output interface to the at least one second input interface. The gearbox is configured to bit-multiplex physical-layer data streams received through first input interfaces operating at a first signaling rate to generate bit-multiplexed data streams that are output through at least one first output interface operating at a second signaling rate which is substantially faster than the first signaling rate, wherein each of the data streams includes an embedded physical-layer data stream identifier. The inverse-gearbox is configured to demultiplex the multiplexed data streams received through at least one second input interface operating at the second signaling rate to recover said each of the data streams and to output the recovered data streams through second output interfaces operating at the first signaling rate, wherein one of the second output interfaces is selected for each of the recovered data streams according to the respective embedded physical-layer data stream identifier.

Another embodiment is a physical layer device including, input interfaces operating at a first rate; one or more output interfaces operating at a second rate, wherein the second rate is substantially higher than the first rate; and a gearbox configured to bit-multiplex physical-layer data streams received through the input interfaces to generate multiplexed data streams that are output through the one or more output interface, wherein each of the data streams includes an embedded physical-layer data stream identifier.

Another embodiment is physical layer device which includes, one or more input interfaces operating at a first rate; output interfaces operating at a second rate, wherein the second rate is substantially lower than the first rate; and an inverse-gearbox configured to demultiplex one or more bit-multiplexed physical-layer data streams received through the one or more input interface to generate recovered data streams that are output through the output interfaces, wherein each of the recovered data streams includes an embedded physical-layer data stream identifier.

Another embodiment is a method for transmitting traffic over Gigabit Ethernet links. The method includes receiving data streams over input interfaces operating at a first signaling rate; identifying, at the physical layer, respective ones of the received data streams; responsive to the identification, mapping each of the received data streams to an output port operating at a second signaling rate, wherein the first and second signaling rates are different; and transmitting said each of the received data streams over the mapped output port.

A computer readable media embodiment includes a computer readable media storing instructions wherein said instructions when executed are adapted to transmit data traffic over Gigabit Ethernet links with a method. The method includes identifying, at the physical layer, respective ones of the received data streams; responsive to the identification, mapping each of the received data streams to an output port operating at a second signaling rate, wherein the first and second signaling rates are different; and transmitting said each of the received data streams over the mapped output port.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 8 is an exemplary table of physical coding sublayer virtual lane identifiers, according to an embodiment.

DETAILED DESCRIPTION OF THE INVENTION

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Embodiments disclosed in the specification provide for increasing the bandwidth capabilities of various communications devices, such as, but not limited to, network switches and routers. Although embodiments of the present invention are described herein primarily with respect to 100 GbE links or 40 GbE links, a person of skill in art would appreciate that the teachings are applicable to future higher Gigabit Ethernet links of higher speeds.

Figure 1:
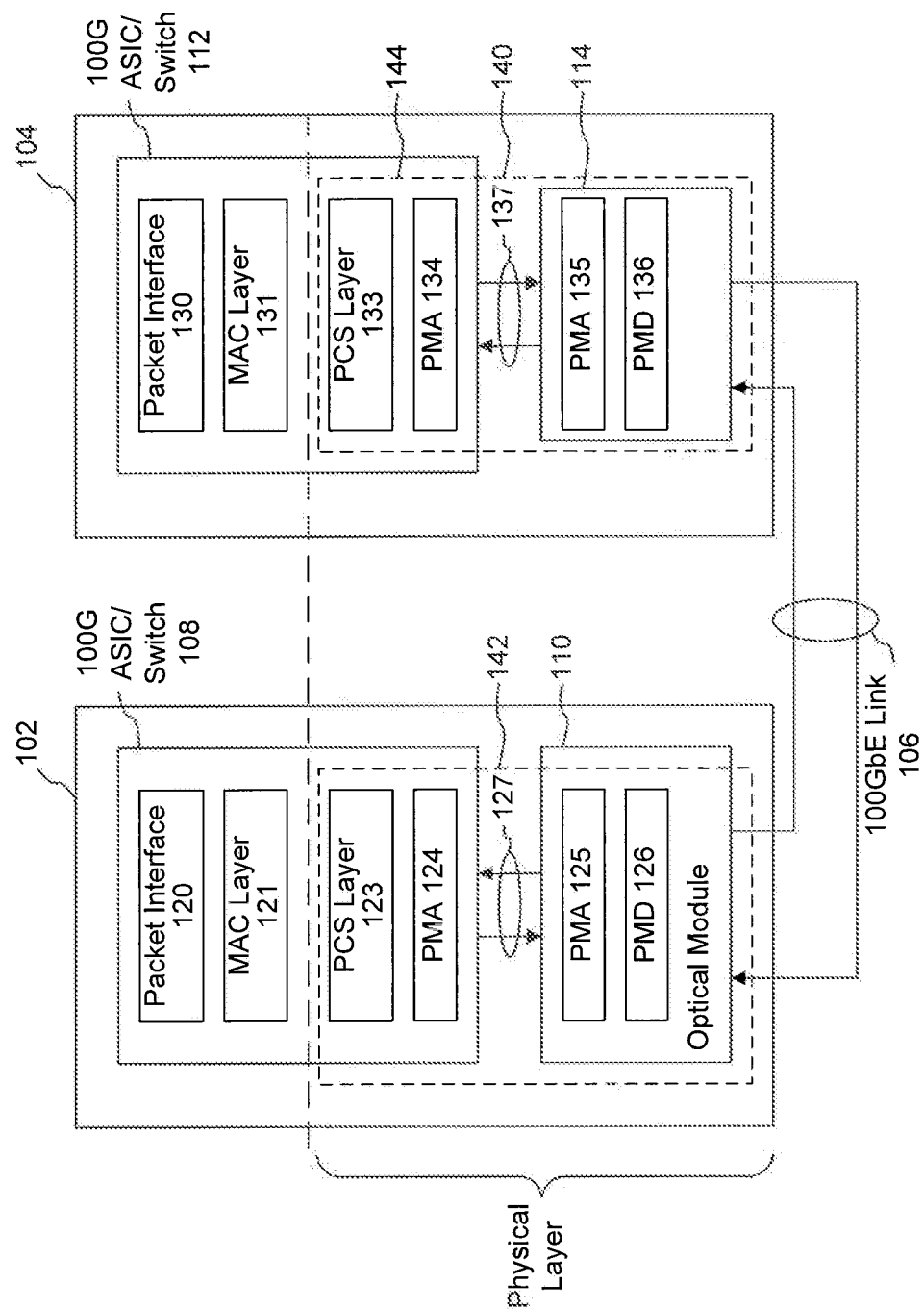
FIG. 1 illustrates an exemplary system comprising network switches interconnected by a Gigabit Ethernet link, according to an embodiment of the present invention.

FIG. 1 illustrates an exemplary system 100 comprising network switches coupled by a data transport link, according to an embodiment of the present invention. Switches 102 and 104 communicate over a Gigabit Ethernet link 106. Switch 102 includes a 100 gigabit (100 G) ASIC/switch 108 and optical module 110 interconnected by interface 127. Similarly, switch 104 includes 100G ASIC/switch 112 and optical module 114 interconnected by interface 137. According to an embodiment, interfaces 127 and 137, between the respective ASIC/switch and optical modules, are electrical interfaces. 100 G ASIC/switch 108 includes a packet interface 120, a media access control (MAC) layer module 121, a PCS layer 123, and a physical media attachment (PMA) 124. Optical module 110 includes PMA 125 and physical media dependent module (PMD) 126. PMD 126, PMA 125 and 124, and PCS layer module 123, as described herein, belong to the physical layer of a network protocol stack. MAC layer 121 and packet interface 120 represent layers above the physical layer of the network protocol stack, and provide access to MAC layer processing and network or higher layer processing, respectively.

Embodiments disclosed herein are directed to increasing the bandwidth capabilities of network devices based upon techniques implemented at the physical layer. PMD 126 provides the interface to the optical transmission medium such as an optical fiber. PMA 125 and 124 are coupled through electrical interface 127. PMA 125 and 124 couple PCS layer module 123 to PMD 126. PCS layer module 123 operates to create and/or detect a plurality of virtual lanes, or streams, of data traffic. Virtual lanes are data streams that can be multiplexed and carried over electrical, optical or other type of physical link. According to IEEE 802.3ba, the PCS layer of the transmitter can embed a unique lane identifier in each detected or created virtual lane. The PCS layer of the receiver can be configured to detect the unique lane identifier.

The IEEE 802.3ba specifies that the unique lane identifiers are used to deskew the various data streams at the receiving end. According to an embodiment of the present invention, PCS layer 123 is configured for 40 GBASE-R and 100 GBASE-R Gigabit Ethernet formats. 40 GBASE-R and 100 GBASE-R are a family of Physical Layer implementations based upon the 64B/66B data coding specified in IEEE 802.3ba Clause 82 and the PMA specification defined in IEEE 802.3ba Clause 83. According to the embodiment, the 40 GBASE-R and/or 100 GBASE-R PCS 123 performs encoding (decoding) of data from (to) the MAC Layer or a Reconciliation Layer (not shown) over a media independent interface such as XLGMII or CGMII to 64B/66B code blocks, distribute the data to multiple lanes, and transfer the encoded data to PMA 124.

PMA 124 and 125 provides a medium-independent means for PCS 123 to support the use of a range of physical media. When using 40 GBASE-R and 100 GBASE-R, PMAs 124 and/or 125 perform the mapping of transmit and receive data streams between PCS 123 and PMA 124 via a PMA service interface (not shown), and the mapping and multiplexing of transmit and receive data streams between PMA 125 and PMD 126 via a PMD service interface (not shown). In addition, the PMAs can perform retiming of the received data stream when appropriate.

100G ASIC/switch 112 includes packet interface 130, MAC layer module 131, PCS layer module 133, and PMA 134 that operate similarly to packet interface 120, MAC layer module 121, PCS layer module 123, and PMA 124, respectively. Optical module 114 includes PMA 135 and PMD 136 that have functionality similar to PMA 125 and PMD 126, respectively.

Figure 2:
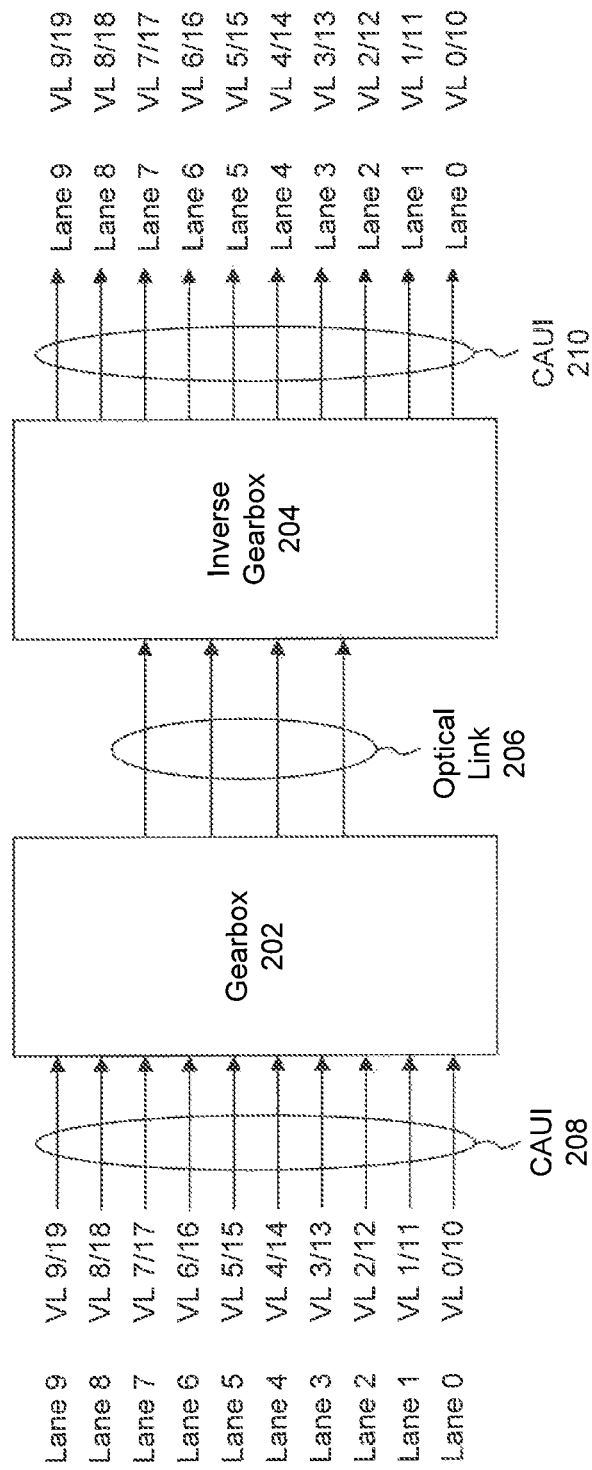
FIG. 2 illustrates an exemplary system comprising a gearbox and an inverse gearbox interconnected by optical cable, according to an embodiment of the present invention.

FIG. 2 illustrates an exemplary system comprising a gearbox 202 and an inverse gearbox 204 coupled by an optical link 206, according to an embodiment of the present invention. Each of physical lanes 0-9, represented as CAUI 208 (CAUI is a standard 100 GbE Attachment Unit Interface), provides a path for one or two virtual lanes to enter gearbox 202. For example, virtual lanes 0 and/or 10 enter gearbox 202 via physical lane 0. Embodiments disclosed herein enable each virtual lane to be assigned to a specific physical lane at the receiving end. The embodiment in FIG. 2, illustrates, for example, 10×10 giga baud (GBd) physical lanes are input to gearbox 202. Each of the 10×10 GBd physical lanes can be an electrical link, and in aggregate the 10×10 GBd lanes form a 100 Gbps input link. In gearbox 202, the virtual lanes arriving on the 10×10 GBd are bit-multiplexed into 4 narrower and faster output physical lanes. For example, the narrower and faster output physical lanes may be 4×25 GBd that, in aggregate, provide a 100 GBd output interface. The bit-multiplexed virtual lanes from gearbox 202 enter inverse gearbox 204 via optical link 206. Inverse gearbox 204 performs bit-demultiplexing and outputs the demultiplexed virtual lanes over 10×10 GBd physical output lanes. Gearbox 204 ensures that each virtual lane is directed to a specific output physical lane. For example, as illustrated in FIG. 2, each of the output virtual lanes can be assigned to one of the physical output lanes of the CAUI interface 210 in such a way as to correspond to the mapping between the physical lanes and virtual lanes on the input side (i.e., in CAUI 208). The mapping of virtual lanes to physical lanes may be preconfigured.

Thus, embodiments of the present invention enable directing each virtual lane to a specific physical lane. As described below, the virtual lanes are directed to specific physical lanes based upon characteristics of each virtual lane or physical layer data stream. The capability to direct virtual lanes to specific physical lanes based upon the physical layer data stream yields significant advantages to embodiments of the present invention over the conventional Gigabit Ethernet technology. For example, each or any group of the virtual lanes arriving over the 10×10 GBd physical lanes may be from independent sources. Thus, embodiments disclosed herein enable independent streams of lower bandwidth Gigabit Ethernet traffic to be bit-multiplexed over higher bandwidth Gigabit Ethernet links. The capability to multiplex data streams from independent sources over the high bandwidth links can lead to higher utilization of the links and an improvement in efficiency.

Figure 3:
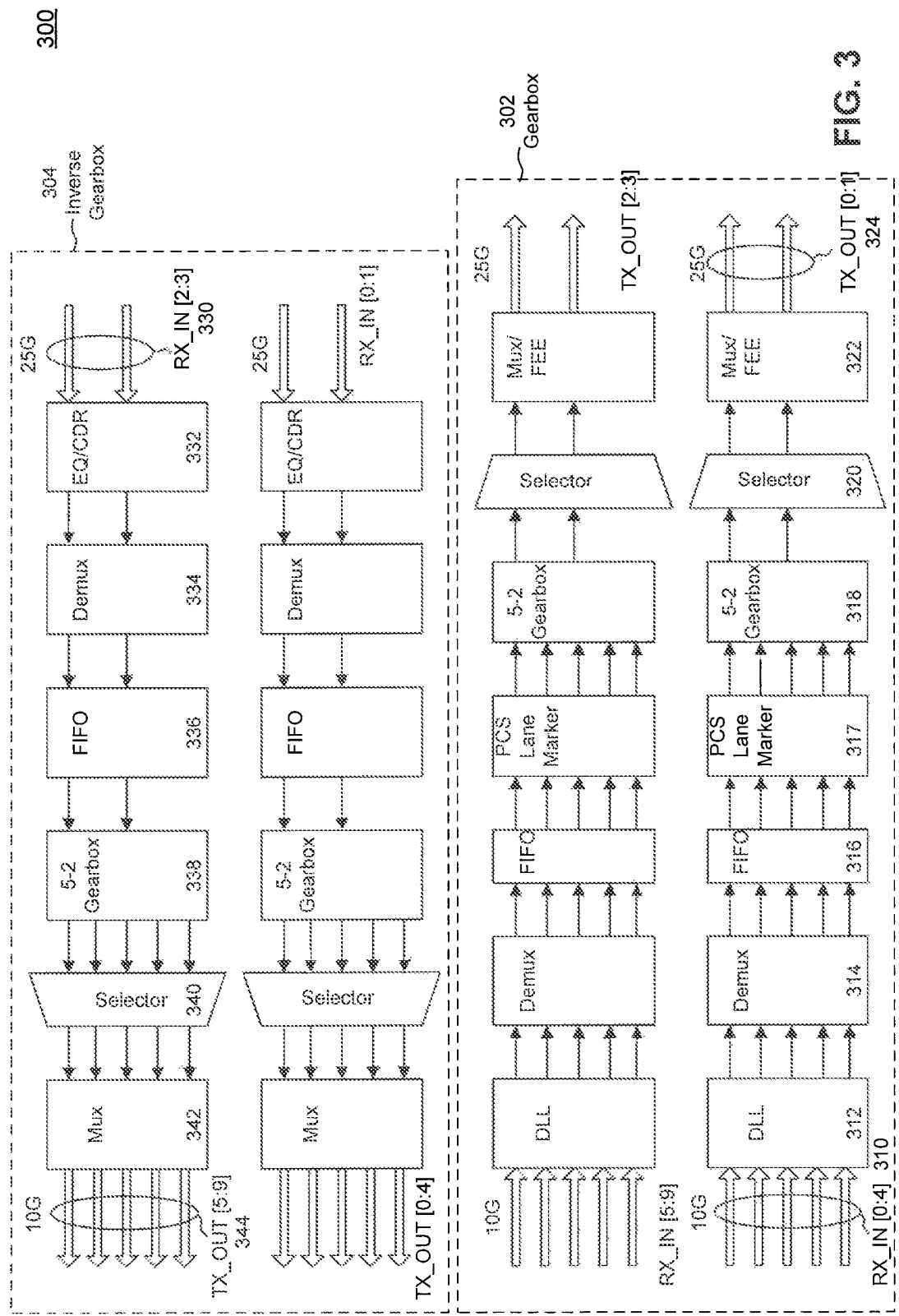
FIG. 3 illustrates a system incorporating a gearbox and an inverse gearbox, according to an embodiment of the present invention.

FIG. 3 illustrates a system 300 incorporating a gearbox 302 and an inverse gearbox 304, according to an embodiment of the present invention. As illustrated, the example embodiment of 100 GbE physical layer device 300 includes two data flow paths for each direction of traffic, wherein each data flow path supports a transport of half of the data flows in a single direction. As would be appreciated, in another embodiment, all of the data flows in a single direction can be handled by a single data flow path.

Consider first the two data flow paths going from left to right in the bottom half of physical layer device 300. Each data flow path is designed to receive as input five 10 Gbps data flows. The lower data flow path receives the five 10 Gbps data flows denoted as RX_IN[0:4], while the upper data flow path receives the five 10 Gbps data flows denoted as RX_IN[5:9]. In general, it is desired that physical layer device 300 facilitate an increase of I/O signaling speed from 10.3125 gigabaud to 25.7 gigabaud, thereby narrowing the I/O interface.

To illustrate such an operation, a description of the upper data flow path in the left-to-right direction of physical layer device 300 is now provided. In general, the increase in I/O speed is facilitated by 5 to 2 gearbox 318, which works on data flows that are marked by 10G PCS Lane Marker module 317. As illustrated, 10G PCS Lane Marker module 317 operates on five 10 Gbps data flows RX_IN[5:9] that have passed through 10 GbE interface 310, a delay locked loop (DLL) module 312, a de-multiplexer (De-Mux) module 314 and a first-in-first-out (FIFO) module 316. Here, it should be noted that in one embodiment, a single 10 to 4 gearbox can be used to facilitate a single data flow path. For example, instead of having two 5 to 2 gearboxes for the 10 data flows that go from left to right in FIG. 3, a single 10 to 4 gearbox can be used. It should also be noted that, in another embodiment, PCS virtual lane identifiers are inserted elsewhere other than 10 G PCS Lane Marker module 317.

10G PCS Lane Marker module 317, according to an embodiment, inserts a bit pattern in each virtual lane in order to uniquely identify the virtual lane. The bit patterns in FIG. 8 are exemplary Multi-Lane Distribution (MLD) PCS lane identifiers used as physical data flow identifiers. MLD PCS lane identifiers are defined in IEEE 802.3 Clause 82. The table 800 in FIG. 8 identifies the data flow identifier components that are arranged in the format illustrated. Here, Bit Interleaved Parity (BIP) field $BIP_7$ is a bit-wise inversion of $BIP_3$. 10G PCS Lane Marker module 317 can insert these bit patterns, determined as a unique value for each PCS virtual lane, at a constant interval or at dynamically determined intervals. Where the gearbox has 10 input data flows, only ten MLD PCS lane identifiers need be used as physical data flow identifiers. In one embodiment, additional MLD PCS lane identifiers can be used to accommodate gearboxes that have greater than ten input data flows.

The time between inserting virtual lane identifiers can be implementation dependent. Moreover, the particular data flow or data flows that are chosen for marking can also be implementation dependent. The insertion interval for these virtual lane identifiers can be preconfigured, or may be determined based upon factors, such as, inter packet gap and distribution of idle frames. Here, it is significant that the marking of one or more data flows enables an inverse gearbox to decode, align, and identify each data flow.

In an alternative embodiment, the payload within a control frame can be modified for data flow marking. For example, a fiber channel control frame payload can be unscrambled and its contents replaced with an unused signal order set that identifies the data flow. As would be appreciated, the particular unused signal order set used that identifies the data flow would be implementation dependent. At the receiving end, the unused signal ordered set would be replaced with the data that previously existed in the payload of the control frame.

In embodiments of the present invention, 5 to 2 gearbox 318 uses bit-multiplexing to adapt a set of input lanes to a set of output lanes at a 5:2 ratio. The 5 to 2 Gearbox 318 is designed to operate on data flows that have been marked with a data flow identifier (virtual lane identifier) by 10G PCS Lane Marker module 317. In general, the addition of data flow identifiers by 10G PCS/Lane Marker module 317 enables an inverse 2 to 5 gearbox to decode, identify, and the align each data flow. Inverse 2 to 5 gearbox can then present each data flow to a specific location or specific output interface based on the data flow identifier.

The gearbox 318 and inverse-gearbox 338 can be implemented in the PMA, such as PMAs 124-125 and 134-135 shown in FIG. 1. For a PMA with m input lanes (Tx or Rx direction), each input lane carries, bit multiplexed, z/m PCS virtual lanes. Each physical input lane has a nominal signaling rate of R×z/m. If bit x received on an input lane belongs to a particular PCS virtual lane, the next bit of that same PCS virtual lane is received on the same input lane at bit position x+(z/m). The z/m PCS virtual lanes may arrive in any sequence on a given input lane.

For a PMA with n output lanes (Tx or Rx direction), each output lane carries, bit multiplexed, z/n PCS virtual lanes. Each output lane has a nominal signaling rate of R×z/n. Each PCS virtual lane is mapped from a position in the sequence on one of the z/m input lanes to a position in the sequence on one of the z/n output lanes. If bit x sent on an output lane belongs to a particular PCS virtual lane, the next bit of that same PCS virtual lane is sent on the same output lane at bit position x+(z/n). The PMA maintains the chosen sequence of PCS virtual lanes on all output lanes while it is receiving a valid stream of bits on all input lanes.

At the receiving end, the data would be decoded by the inverse gearbox to identify each data flow per the included physical data flow identifiers. According to an embodiment, the inverse gearbox would then replace the physical data flow identifier with the Ethernet idle frame before presentation of the data at a specific output port.

Here, it should be noted that the addition of physical data flow identifiers enables the physical layer device to source traffic on a fractional pipe where a portion of the capacity of the higher-rate output data flows is left unused. For example, 40 Gbps traffic can be input on RX_IN[5:9] and output as 2×20 Gbps traffic on TX_OUT[2:3].

As has been described, various mechanisms can be used by 10G PCS Lane Marker module 317 in physical layer device 300 to mark the data flows that are received at the input (e.g., RX_IN[5:9]). Returning to FIG. 3, the marked data flows are then passed to 5 to 2 Gearbox 318. 5 to 2 Gearbox 318 receives the 66-bit data flow frames from the five 10 Gbps input data flows marked by 10G PCS Lane Marker module 317 and generates two higher-rate 25G data flows in accordance with a frame distribution scheme defined by the 5:2 ratio. As would be appreciated, a 5 to 2 gearbox can also be defined that can generate four 25 Gbps data flows from ten 10 Gbps data flows.

More generally, it should be noted that the principles of the present invention are not confined to the example 5:2 ratio. Other ratios can be used to accommodate specific combinations of input and output data flows.

Each PCS virtual lane received in any temporal position on an input lane is transferred into a temporal position on an output lane. Embodiments of the present invention enable the alignment of PCS virtual lanes from independent data streams according to a predetermined or configurable pattern such the respective PCS virtual lanes are assigned to specific output interfaces.

5 to 2 Gearbox 318 passes the two higher rate 25 Gbps data flows to Selector module 320. Although not shown, Selector module 320 also receives loopback and pattern generation inputs. Selector module 320 passes one of the selected inputs to Multiplexer (Mux)/Feed Forward Equalizer (FFE) module 322. Mux/FFE module 322 then outputs the two higher rate 25 Gbps data flows as TX_OUT[2:3].

The two higher rate 25 Gbps output data flows represent a higher rate I/O interface that facilitates a narrower interface module. The counterpart to the transmit direction in the lower half of physical layer device 300 is the receive direction in the upper half of physical layer device 300.

As illustrated, the upper data flow path in the right-to-left direction of physical layer device 300 receives two higher rate 25 Gbps data flows as inputs RX_IN[2:3] by Equalization (EQ)/Clock and Data Recovery (CDR) module 332. The signals received by EQ/CDR module 332 then pass through De-Mux module 334, and FIFO module 336 before being presented to the inverse 2 to 5 Gearbox 338. A module to de-skew the data streams may or may not be present before the inverse 2 to 5 Gearbox 338. For example, where all virtual lanes have data streams that are independent from each other, deskewing data streams with respect to each other is not required. In one embodiment, a single inverse 4 to 10 gearbox can be used to facilitate a single data flow path.

In addition to generating five 10 Gbps data flows based on the two 25 Gbps data flows in accordance with the defined 2:5 ratio, 2 to 5 Gearbox 338 is also operative to remove the data flow markers that were inserted by 10G PCS Lane Marker module 317.

2 to 5 Gearbox 338 passes the five lower rate 10 Gbps data flows to Selector module 340. Although not shown, Selector module 340 also receives loopback and pattern generation inputs. Selector module 340 passes one of the selected inputs to Mux module 342. Mux module 342 then outputs the five lower rate 10 Gbps data flows as TX_OUT[5:9] over 10 Gbps interface 344.

Figure 4:
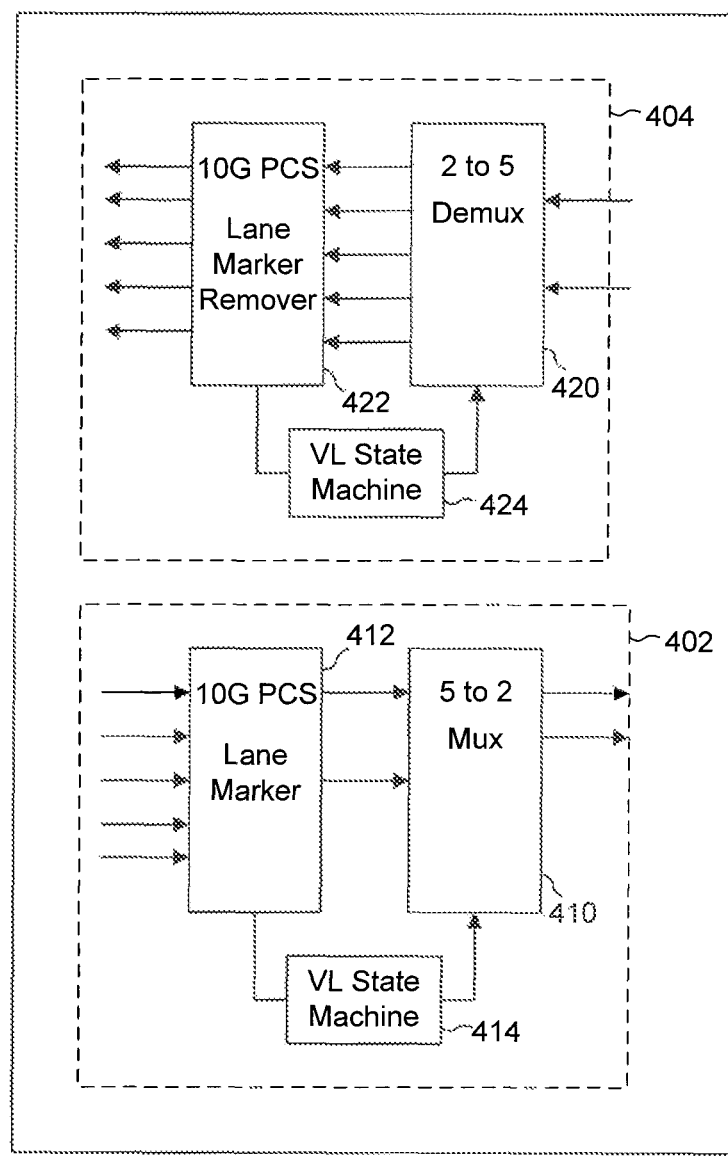
FIG. 4 illustrates a gearbox/inverse gearbox, according to an embodiment of the present invention.

FIG. 4 illustrates a physical layer device 400, according to an embodiment of the present invention. Specifically, physical layer device 400 includes a gearbox 402 and inverse gearbox 404. As described above, a gearbox multiplexes a plurality of lower rate data streams to a lower number of higher rate data streams, and an inverse gearbox demultiplexes one or more high rate multiplexed data streams into a higher number of lower rate data streams. In the illustrated embodiment, gearbox 402 multiplexes 5×10 Gbps data streams to 2×25 Gbps data streams and inverse gearbox 404 demultiplexes the 2×25 Gbps data streams to 5×10 Gbps data streams.

Gearbox 402 comprises 5 to 2 multiplexer 410, a 10G PCS lane marker 412, and a VL state machine 414. The 5 to 2 multiplexer 410 takes as input the input of 5 physical input links and bit-multiplexes the data streams to 2 physical output links. The bit-multiplexing can be based upon an identifier embedded in each of the virtual lanes that are input.

Figure 7:
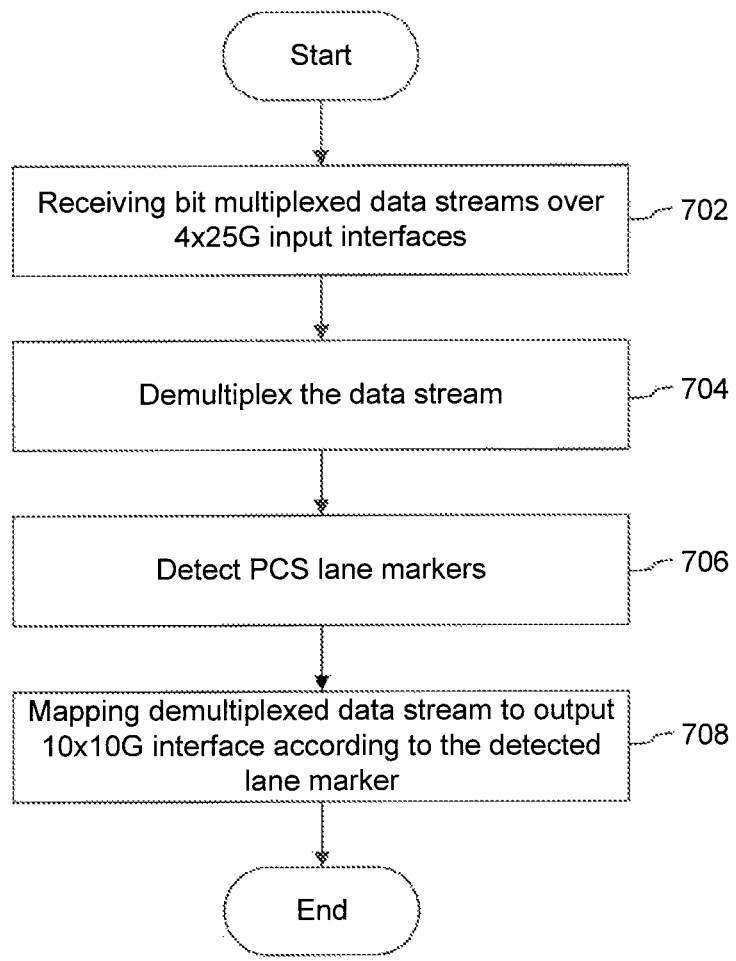
FIG. 7 illustrates a flowchart describing a method of demultiplexing a plurality of higher rate data streams into lower rate data streams, according to an embodiment of the present invention.

10G PCS lane marker 412 takes as input data arriving on 5 physical input interfaces operating, for example, at 10 Gbps, identifies virtual lanes in the incoming data, and marks each virtual lane with an identifier. 10G PCS lane marker 412, as noted above, operates at the physical layer of the network protocol stack, in order to identify and mark each virtual lane. According to an embodiment, a unique bit pattern is used as the identifier for a particular virtual lane. Example, unique bit patterns are shown in FIG. 7. In order to compensate for the additional bit overhead imposed by the inserted identifiers, the PCS sublayer or other component may selectively remove one or more Ethernet Idle packets that are transmitted during inter packet gaps.

VL state machine 414 operates to provide input to 5 to 2 multiplexer 410 based upon the identifiers inserted in 10G PCS lane marker 412. Based upon the input provided by VL state machine 414, 5 to 2 multiplexer can adjust the alignment of the incoming data streams in order to direct them to specific ones of the output physical interfaces.

Gearbox 404 comprises 2 to 5 multiplexer 420, a 10G PCS lane marker remover 422 and a VL state machine 424. The 2 to 5 demultiplexer 420 takes as input the input of 2 physical input links and bit-demultiplexes the data streams to 5 physical output links. The bit-demultiplexing is based upon an identifier embedded in each of the multiplexed PCS virtual lanes that are input.

10G PCS lane marker remover 422 detects the virtual lane identifiers inserted in each of the data streams and removes them. Based upon respective ones of the detected identifiers, 10G PCS lane marker remover 422 provides input to VL state machine 424 which in turn provides input to 2 to 5 demultiplexer that may adjust the alignment associated with each of the input data streams in order to direct the virtual streams to the specific output interfaces. When removing virtual lane identifiers from each virtual lane, 10G PCS lane marker remover 422 or other another module may insert Ethernet idle frames in order to compensate for the reduction in the bits that are transmitted. In effect, the inter packet gap (IPG) is reduced to compensate for the added virtual lane identifiers so that the bit rate remains the same before and after the insertion of the virtual lane identifiers.

Figure 5:
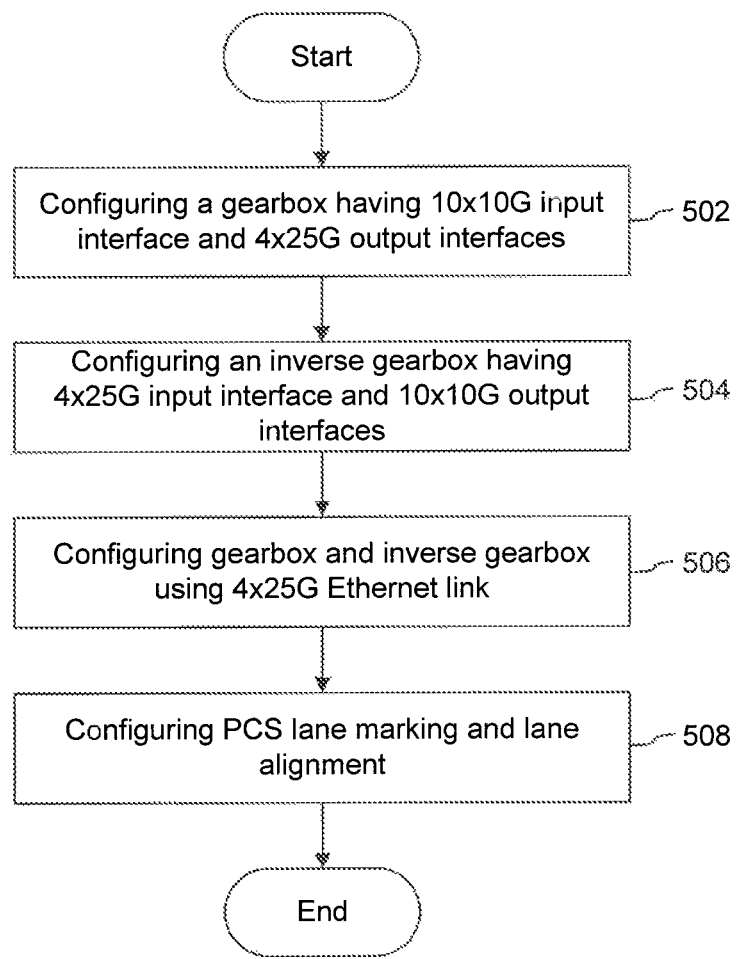
FIG. 5 illustrates a flowchart of a method for configuring a gearbox and inverse gearbox, according to an embodiment of the present invention.

FIG. 5 illustrates a flowchart of an exemplary method for configuring a gearbox and inverse gearbox, according to an embodiment of the present invention.

In step 502, a gearbox is configured. According to an embodiment, the gearbox is configured with 10×10 Gbps input ports and 4×25 Gbps output ports. Thus, the gearbox is configured to bit-multiplex incoming 10 Gbps data streams into fewer 25 Gbps multiplexed data streams.

In step 504, an inverse gearbox is configured. According to an embodiment, the inverse gearbox is configured with 4×25 Gbps input ports and 10×10 Gbps output ports. Thus, the inverse-gearbox is configured to demultiplex incoming 25 Gbps data streams into larger number of 10 Gbps data streams.

In step 506, the gearbox and inverse-gearbox are coupled with, for example, optical cables to form a gigabit ethernet link between the two. For example, the link between the gearbox and inverse-gearbox may be a 4×25 Gbps optical link.

In step 508, at the gearbox end, PCS lane marking is configured, and at the inverse-gearbox end PCS lane marking removal is configured. According to an embodiment, 10 or 20 PCS lanes may be multiplexed into the 10 electrical lanes. Each PCS lane may correspond to traffic from an independent source. Each PCS lane is identified by a unique bit pattern. The interval at which the identifying bit patterns are inserted is configurable. The interval is not required to be constant over time. After the insertion of the identification bit pattern, the PCS lanes are multiplexed to respective ones of the physical electrical lanes. Alignment of respective data streams to specific physical output lanes of the gearbox may be configured. For example, such configuration may enable the operation of a VL state machine, such as VL state machine 414, to align PCS virtual lanes to specific output lanes of the gearbox.

At the inverse-gearbox end, the assignment of respective PCS lanes to physical links is configured. According to an embodiment, a default assignment may be configured as shown in FIG. 2, where the physical lanes in the gearbox and the inverse-gearbox have correspondingly mapped PCS lanes. A state machine, such as VL state machine 424, can operate to align PCS virtual lanes to specific output lanes at the inverse-gearbox.

Figure 6:
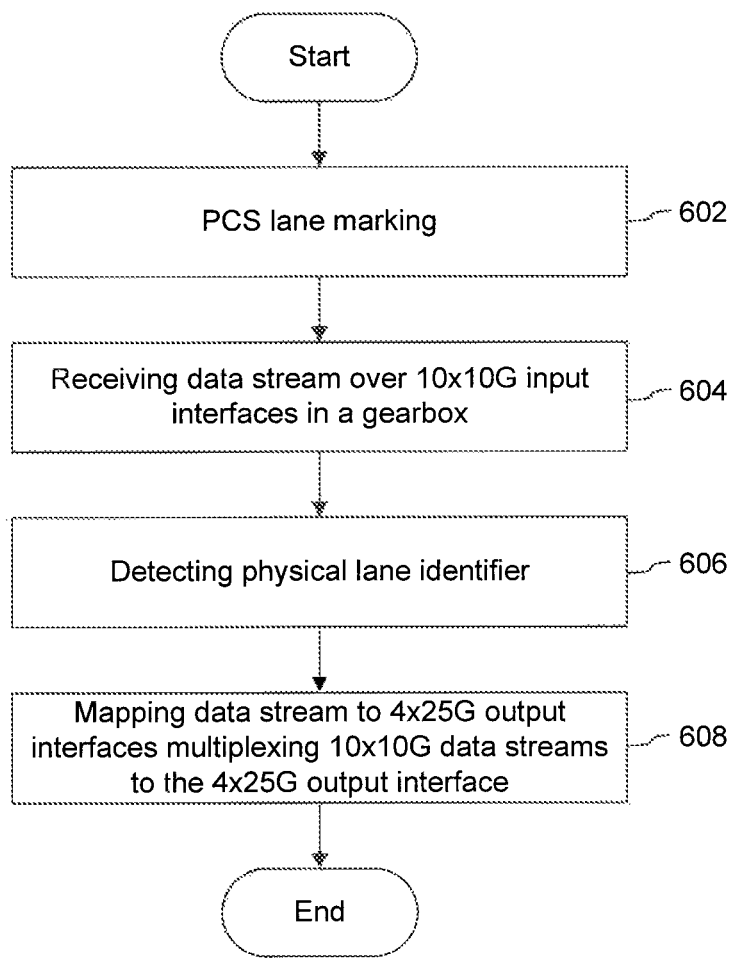
FIG. 6 illustrates a flowchart describing a method of multiplexing a plurality of lower rate data streams into higher rate data streams, according to an embodiment of the present invention.

FIG. 6 illustrates a flowchart describing an exemplary method of multiplexing a plurality of lower rate data streams into higher rate data streams, according to an embodiment of the present invention.

In step 602, PCS lane markers are inserted in each PCS lane as described above. One or more Ethernet Idle frames may be removed in order to maintain the bitrate due to the introduction of PCS lane markers.

In step 604 marked PCS lanes are received over 10×10G interfaces in a gearbox. According to an embodiment, each of the PCS virtual lanes is from respective independent sources.

In step 606, PCS lanes are detected based upon the embedded PCS lane identifiers. The PCS lane identifiers are detected at the physical layer.

In step 608, the detected PCS lanes are mapped to respective ones of the output 4×25G links.

FIG. 7 illustrates a flowchart describing an exemplary method of demultiplexing a plurality of higher rate data streams into lower rate data streams, according to an embodiment of the present invention.

in step 702, bit multiplexed data streams are received over 4×25 Gbps links at an inverse-gearbox.

In step 704, the received data streams are bit-demultiplexed.

In step 706, PCS lane markers are identified in the received data streams. Based upon the detected lane markers identification of the respective PCS lanes is performed.

In step 708, the detected PCS lanes are associated with respective output lanes.

FIG. 8 illustrates an exemplary set 800 of PCS lane markers. Set 800 illustrates a unique bit encoding for each of PCS lanes 0-19. The bit encodings illustrated in set 800 are replicated from IEEE 802.3 Clause 82. Set 800 is only exemplary, and as a person of skill in the art would appreciate, any subset of codes, or any other unique code can be used to represent PCS lane markings.

Figure 9:
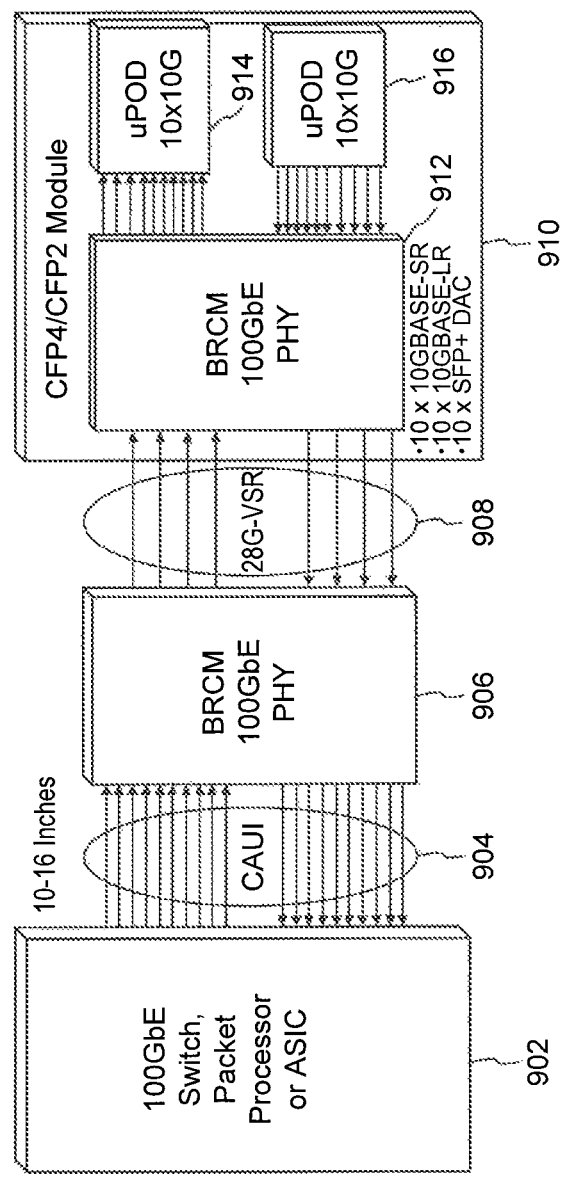
FIG. 9 illustrates a system in which the switch or ASIC I/O does not include support for PCS lane identifiers, according to an embodiment.

FIG. 9 illustrates an embodiment in which a switch or ASIC I/O does not include support for PCS lane identifiers. System 900 illustrates a processing platform 902 communicatively coupled to an optical module 910 through an optical link 908. Processing platform 902 may be a switch/packet processor/ASIC and may include 100 GbE PHY 906 coupled by a 10×10 Gbps CAUI interface 904, as illustrated. Optical module 910 may be a C Form-factor Pluggable (CFP) optical module, as illustrated. Optical module 910 includes 100 GbE PHY 912 which is coupled via an 10×10 Gbps electrical receive module 914 and a 10×10G electrical transmit module 916 to transmission media (not shown). In the illustrated embodiments PHY 906 and PHY 912 can perform the inserting as well as removing of virtual lane identifiers. Prior to removal of virtual lane identifiers, those are used to align PCS virtual lanes with given physical lane. FIG. 9 shows an example embodiment that can support ten ports of 10 GbE, 1 port of 40 GbE with 6 ports of 10 GbE, or 2 ports of 40 GbE with ports of 10 GbE.

Figure 10:
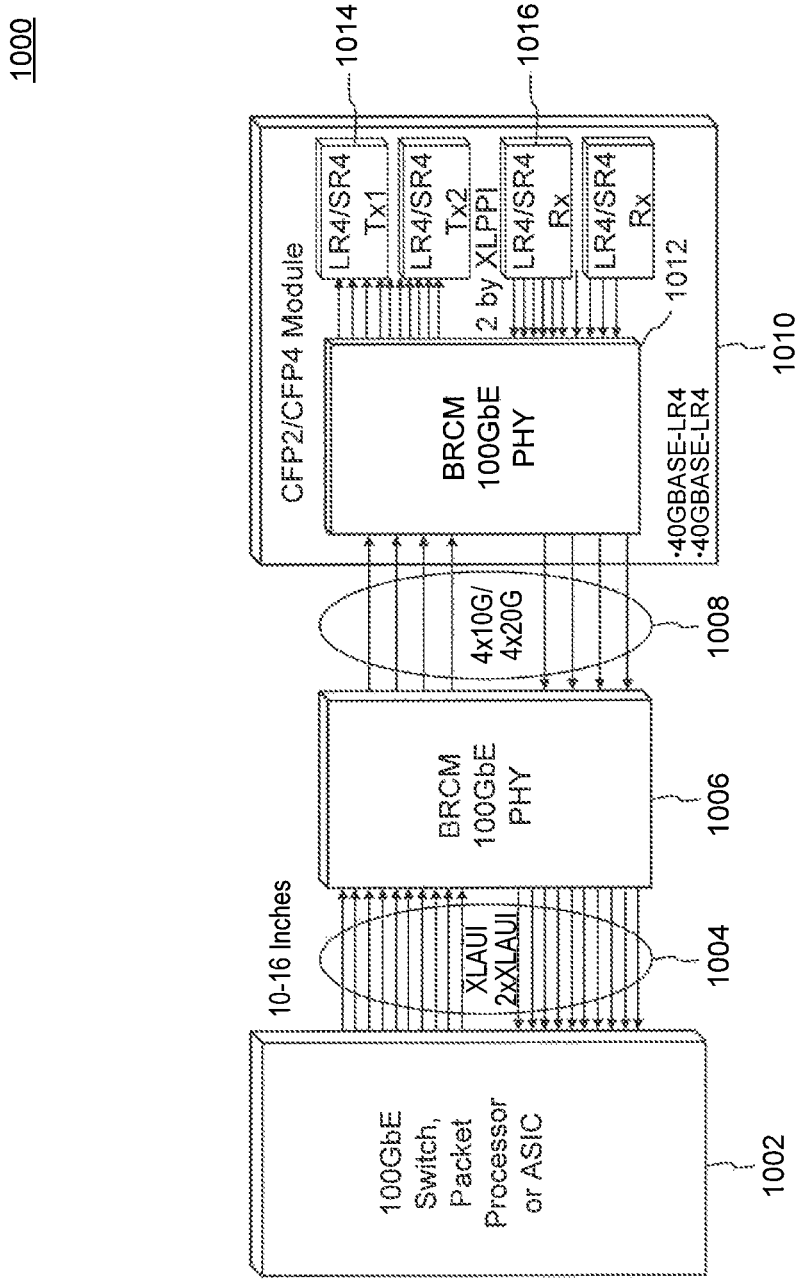
FIG. 10 illustrates another system in which the switch or ASIC I/O does not include support for PCS lane identifiers, according to an embodiment.

FIG. 10 illustrates another embodiment in which the switch or ASIC I/O does not include support for PCS lane identifiers. System 1000 illustrates a processing platform 1002 communicatively coupled to an optical module 1010 through an optical link 1008. Switch/packet processor/ASIC 1002 and 100 GbE PHY 906 are coupled by one or two "40 Gigabit Attachment Unit Interface", or XLAUI interface 1004, as illustrated. CFP optical module 1010 includes 100 GbE PHY 1012 which is coupled via two 4×10 G transmit "40 Gigabit Parallel Physical Interface" or XLPPI 1014 and two 4×10G receive XLPPI 1016 to transmission media. In the illustrated embodiments PHY 1006 and PHY 1012 can perform the inserting as well as removing of virtual lane identifiers. FIG. 10 shows an example implementation that can support one port of 40 GbE or 2 ports of 40 GbE.

Figure 11:
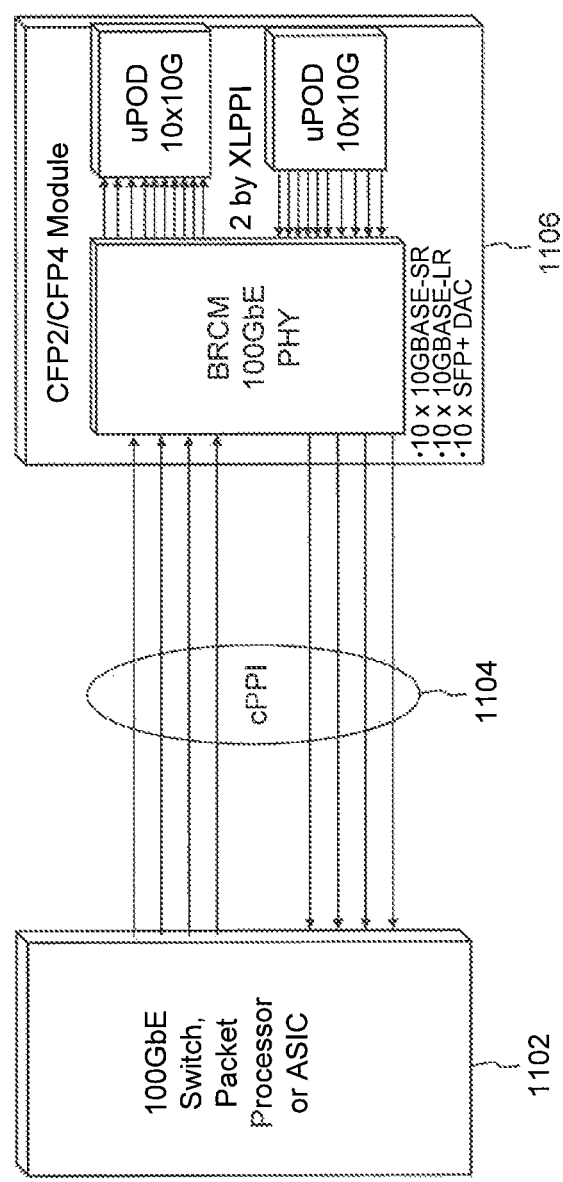
FIG. 11 illustrates a system where a switch includes the functionality of inserting and removing PCS lane markers, according to an embodiment.

FIG. 11 illustrates an embodiment 1100 where the switch/ASIC/packet processor 1102 includes the functionality of inserting and removing PCS lane markers. In this embodiment, the Switch/ASIC will be inserting virtual lane identifiers. The switch input will be able to operate with these virtual lane identifiers in place of Ethernet Idle. This will allow the PHYs which include the gearbox and the inverse gearbox in the optical module to bypass its PCS functions of inserting and removing virtual lane identifiers. The virtual lane state machine in the PCS in the optical module can operate in auxiliary mode for lowest latency. The link between switch 1102 and optical module 1106 may be formed by a 100 GbE Parallel Physical Interface (CPPI) 1104. In another embodiment, the link 1104 may be formed by a 40 GbE Parallel Physical Interface (XLPPI).

Figure 12:
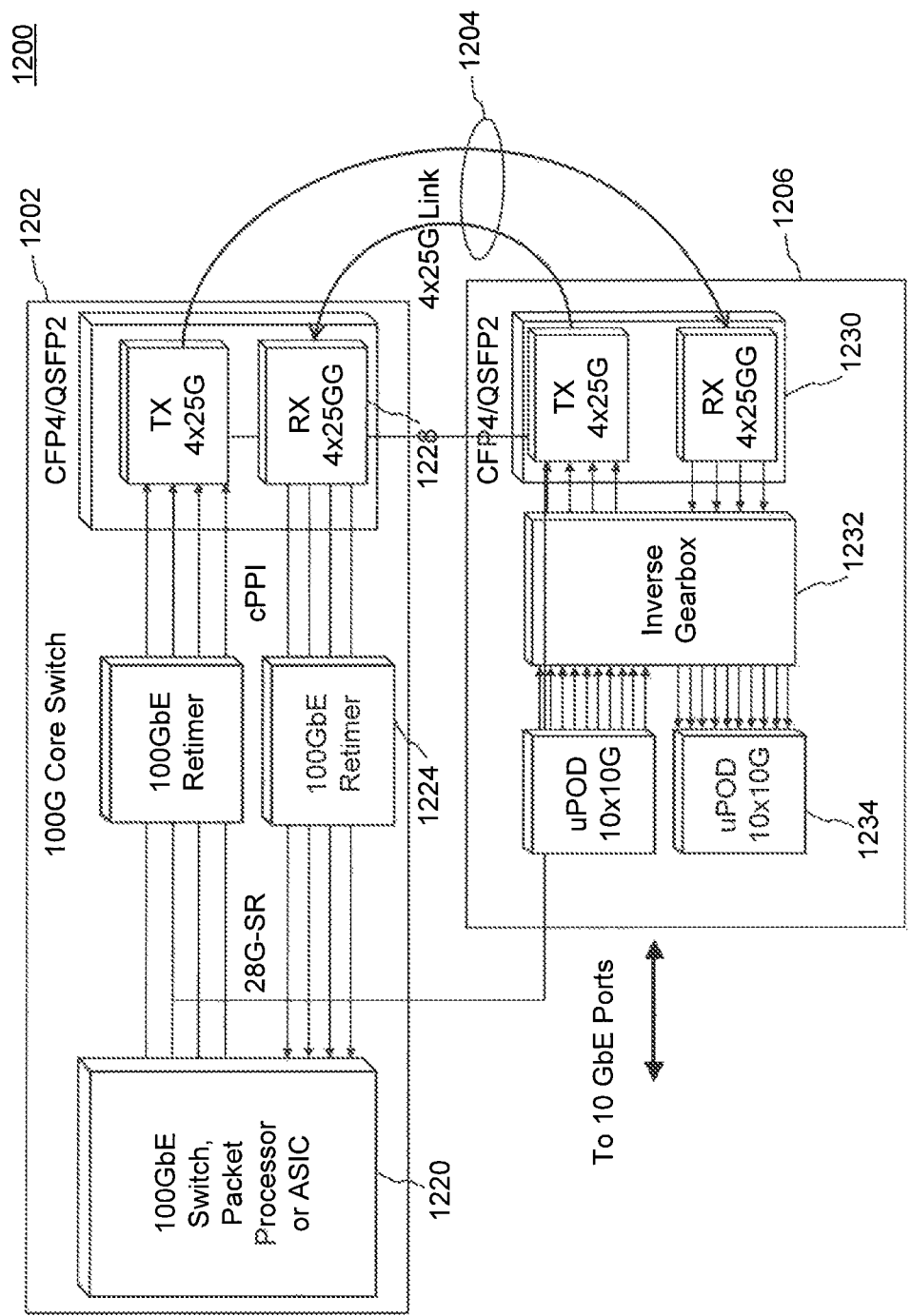
FIG. 12 illustrates a port expander where a blade or box of a switch is expanded through use or a gearbox/inverse-gearbox with PCS virtual lanes, according to an embodiment.

FIG. 12 illustrates, according to an embodiment, a system 1200 including a port expander 1206 where a blade or box 1202 is expanded through use of a gearbox/inverse-gearbox 1232 with virtual lanes. Switch 1202 and port expander 1205 are coupled through 4×25 Gbps link 1204 between optical modules 1228 and 1230. Port expander 1206 includes 10×10 Gbps interfaces 1234. 100 GbE retimers 1224 are included between the switch/ASIC/packet processor 1220 and port expander 1205.

Figure 13:
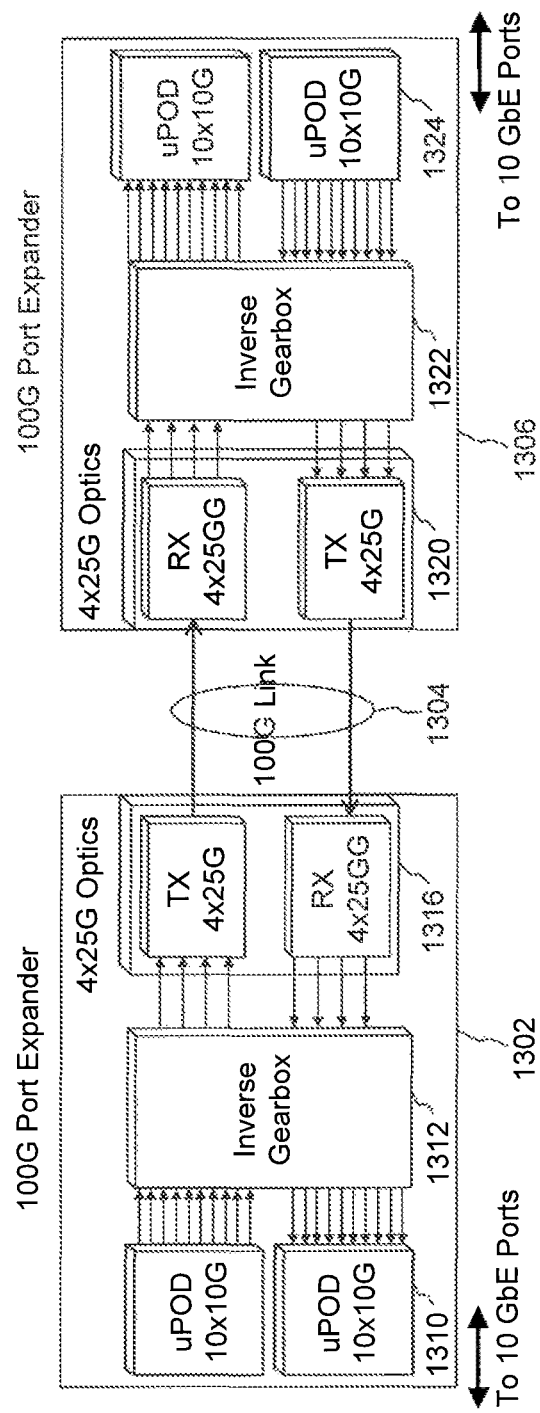
FIG. 13 illustrates a system including two port expanders coupled with a 100 G transport link, according to an embodiment.

FIG. 13 illustrates an embodiment 1300 including two port expanders coupled with a 100 GbE transport link. As illustrated, two port expanders 1302 and 1306 are coupled to create 100 GbE or higher speed Ethernet transport 1304 which resolves several capacity deficiencies of Ethernet when compared to SONET. Each port expander 1302 and 1306 includes its own gearbox/inverse-gearbox 1312 or 1322. The 100 GbE link 1304 may comprise 4×25 Gbps links between optical modules 1316 and 1320. Port expanders 1302 and 1306 can connect to their respective hosts via respective 10×10 Gbps ports 1310 and 1324.

The representative functions of the communications device described herein can be implemented in hardware, software, or some combination thereof. For instance, processes 500, 600 and 700 can be implemented using computer processors, computer logic, ASIC, FPGA, DSP, etc., as will be understood by those skilled in the arts based on the discussion given herein. Accordingly, any processor that performs the processing functions described herein is within the scope and spirit of the present invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A physical layer device, comprising:
   a plurality of input interfaces operating at a first rate;
   one or more output interfaces operating at a second rate, wherein the second rate is substantially higher than the first rate; and
   a gearbox configured to bit-multiplex physical-layer data streams received through the plurality of input interfaces to generate multiplexed physical-layer data streams that are output through the one or more output interfaces, wherein each of the physical-layer data streams includes an embedded physical-layer data stream identifier, the gearbox including a virtual lane state machine configured to:
   detect the physical-layer data stream identifier in each of the physical layer data streams,
   determine a corresponding output interface from among a plurality of output interfaces corresponding to each of the physical layer data streams based upon the detected physical-layer data stream identifiers, and
   adjust each physical layer data stream to output each of the physical layer data streams to the corresponding output interface.

2. The physical layer device of claim 1, wherein the plurality of input interfaces are electrical interfaces and the one or more output interfaces are optical interfaces.

3. The physical layer device of claim 1, wherein each of the physical-layer data stream identifiers is embedded in its corresponding physical layer data stream by a physical coding sublayer.

4. The physical layer device of claim 1, further comprising:
   a physical coding sublayer configured to embed the physical-layer data stream identifier in each of the physical layer data streams.

5. The physical layer device of claim 1, wherein the first rate is 10.3125 gigabaud and the second rate is 25.78 gigabaud.

6. The physical layer device of claim 1, wherein the first rate is 10.3125 gigabaud and the second rate is 100 gigabaud.

7. The physical layer device of claim 1, further comprising 10 input interfaces each operating at the first rate of 10.3125 gigabaud, and 4 output interfaces each operating at the second signaling rate of 25.78 gigabaud.

8. A physical layer device, comprising:
   one or more input interfaces operating at a first rate;
   a plurality of output interfaces operating at a second rate, wherein the second rate is substantially lower than the first rate; and
   an inverse-gearbox configured to demultiplex one or more bit-multiplexed physical-layer data streams received through the one or more input interfaces to generate recovered data streams that are output through the plurality of output interfaces, wherein each of the recovered data streams includes an embedded physical-layer data stream identifier, the inverse gearbox including a virtual lane state machine configured to:
   detect the embedded physical-layer data stream identifier in each of the bit-multiplexed physical-layer data streams,
   determine a corresponding output interface from among the plurality of output interfaces to which a corresponding recovered data stream from among the recovered data streams is to be output based upon the detected embedded physical-layer data stream identifier, and
   adjust each of the demultiplexed physical layer data streams to output each of the demultiplexed physical layer data streams to its corresponding output interface.

9. The physical layer device of claim 8, farther comprising:
   a physical coding sublayer configured to remove the embedded physical-layer data stream identifier in each of the demultiplexed physical-layer data streams.

10. The physical layer device of claim 8, wherein the first rate is 25.78 gigabaud and the second rate is 10.3125 gigabaud.

11. The physical layer device of claim 8, wherein the first rate is 100 gigabaud and the second rate is 10.3125 gigabaud.

12. The physical layer device of claim 8, wherein the one or more input interfaces comprise:
   4 input interfaces each operating at the first rate of 25.78 gigabaud, and wherein the plurality of output interfaces comprises:

10 output interfaces each operating at the second rate of 10.3125 gigabaud.

13. A physical layer device, comprising:
a delay locked loop (DLL) configured to receive a plurality of data streams operating at a first rate;
a lane marker coupled to an output of the DLL, wherein the lane marker is configured to insert a respective bit pattern into each lane in the plurality of data streams, thereby generating a plurality of marked data streams;
a gearbox comprising a state machine, wherein the gearbox is coupled to an output of the lane marker, and wherein the gearbox is configured to:
receive the plurality of marked data streams,
adjust, using the state machine, an alignment of a first data stream in the plurality of marked data streams based on a first bit pattern inserted into the first data stream, wherein the first data stream operates at a second rate, and
adjust, using the state machine, an alignment of a second data stream in the plurality of marked data streams based on a second bit pattern inserted into the second data stream, wherein the second data stream operates at the second rate; and
a multiplexer coupled to an output of the gearbox, wherein the multiplexer is configured to:
output the first data stream to a first physical interface, and
output the second data stream to a second physical interface.

14. The physical layer device of claim 13, further comprising:
a demultiplexer coupled to an output of the DLL; and
a buffer coupled to an output of the demultiplexer and to an input of the lane marker.

15. The physical layer device of claim 13, wherein the bit pattern is a multi-lane distribution (MLD) physical coding sublayer (PCS) identifier.

16. The physical layer device of claim 13, wherein the lane marker is configured to insert the bit pattern into each virtual lane at a preconfigured insertion interval.

17. The physical layer device of claim 13, wherein the lane marker is configured to insert the bit pattern into each virtual lane based on an inter packet gap in the plurality of data streams.

18. The physical layer device of claim 13, wherein the lane marker is configured to insert the bit pattern into each virtual lane based on a distribution of idle frames in the plurality of data streams.

19. The physical layer device of claim 13, further comprising:
a selector coupled to an output of the gearbox and to an input of the multiplexer.

20. A physical layer device, comprising:
a Clock and Data Recovery (CDR) module configured to receive a plurality of marked data streams operating at a first rate;
an inverse-gearbox coupled to an output of the CDR module, wherein the inverse-gearbox comprises:
a lane marker remover, wherein the lane marker remover is configured to detect and remove a plurality of bit patterns in the plurality of marked data streams, thereby generating a plurality of unmarked data streams,
a state machine coupled to an output of the lane marker remover, wherein the state machine is configured to:
receive input from the lane marker remover based on the plurality of bit patterns, and
output alignment information based on the input from the lane marker remover, and
a demultiplexer coupled to an output of the state machine, wherein the demultiplexer is configured to:
adjust, based on the alignment information, an alignment of a first data stream in the plurality of unmarked data streams, wherein the first data stream operates at a second rate, and
adjust, based on the alignment information, an alignment of a second data stream in the plurality of unmarked data streams, wherein the second data stream operates at the second rate; and
a multiplexer coupled to an output of the inverse-gearbox, wherein the multiplexer is configured to:
output the first data stream to a first physical interface, and
output the second data stream to a second physical interface.

* * * * *

UNITED STATES PATENT AND TRADEMARK OFFICE
CERTIFICATE OF CORRECTION

| | |
|---|---|
| PATENT NO. | : 8,873,591 B2 |
| APPLICATION NO. | : 13/250628 |
| DATED | : October 28, 2014 |
| INVENTOR(S) | : Ghiasi et al. |

Page 1 of 1

It is certified that error appears in the above-identified patent and that said Letters Patent is hereby corrected as shown below:

In the Claims,

Column 12, lines 26-27, please replace "second signaling rate" with --second rate--.

Column 12, line 54, please replace "farther comprising" with --further comprising--.

Signed and Sealed this
Twenty-fourth Day of March, 2015

Michelle K. Lee
*Director of the United States Patent and Trademark Office*